Sept. 2, 1941.  W. J. BRETH ET AL  2,254,596

TUBE SPLICING MACHINE

Filed Jan. 27, 1937.  5 Sheets-Sheet 1

INVENTORS
*Walter J. Breth*
*Max L. Engler*
BY *Evans + McCoy*
ATTORNEYS

INVENTORS
Walter J. Breth
Max L. Engler
BY Evans + McCoy
ATTORNEYS

Sept. 2, 1941.  W. J. BRETH ET AL  2,254,596
TUBE SPLICING MACHINE
Filed Jan. 27, 1937  5 Sheets-Sheet 4

INVENTORS
Walter J. Breth
Max L. Engler
BY Evans + McCoy
ATTORNEYS

INVENTORS
Walter J. Breth
Max L. Engler
BY Evans & McCoy
ATTORNEYS

Patented Sept. 2, 1941

2,254,596

UNITED STATES PATENT OFFICE 2,254,596

TUBE SPLICING MACHINE

Walter J. Breth and Max L. Engler, Akron, Ohio, assignors to The General Tire & Rubber Company, Akron, Ohio, a corporation of Ohio Application January 27, 1937, Serial No. 122,623

17 Claims. (Cl. 154—9)

This invention relates to machines for making an integral union between ends of uncured rubber stock and particularly for splicing together the ends of uncured rubber tubes to make inner tubes for pneumatic tires.

The present invention is a continuation in part of our co-pending application Serial No. 52,395, filed November 30, 1935, now Patent No. 2,186,286, granted January 9, 1940.

The present invention has for its object to provide means for aligning and gripping the ends of the stock to be joined and applying pressure to the abutting ends of the stock to cause said ends to integrally unite.

A further object of the invention is to provide means for so confining the ends of the stock during the joining operation as to provide the desired cross-sectional configuration at the splice.

A further object of the invention is to provide a machine of simple and compact construction which is rapid and efficient in operation.

A further object is to provide a machine which performs the required cycle of operation in proper sequence and which, after the completion of each splicing operation, is automatically reset for another splicing operation.

With the above and other objects in view the invention may be said to comprise a machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which.

Figure 1:
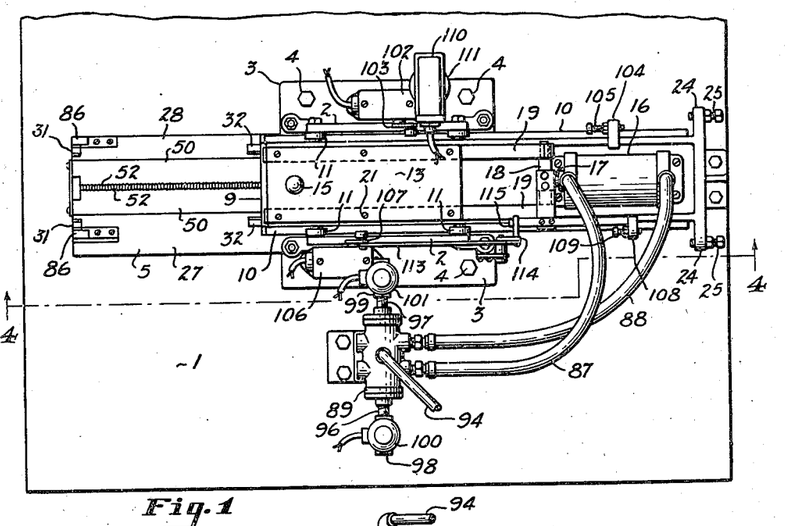
Figure 1 is a top plan view of a machine embodying the invention.
Figure 2:
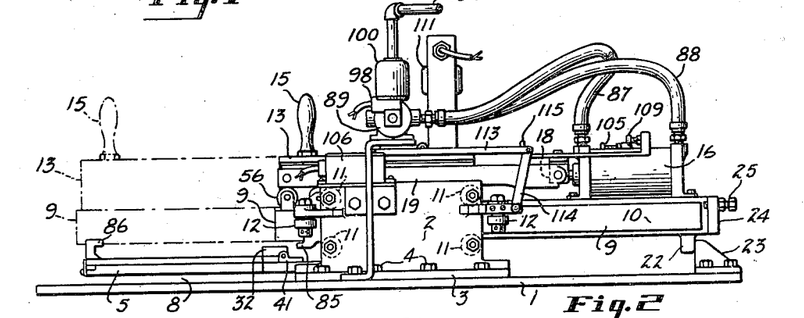
Fig. 2 is a side elevation of the machine.
Figure 3:
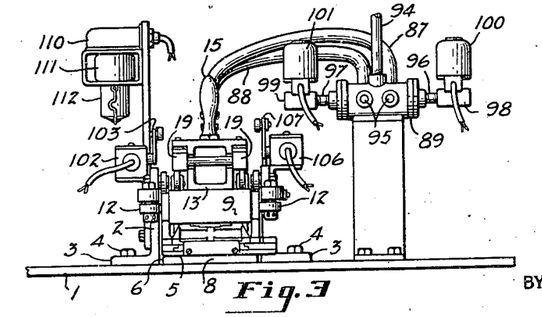
Fig. 3 is a front elevation of the machine.
Figure 4:
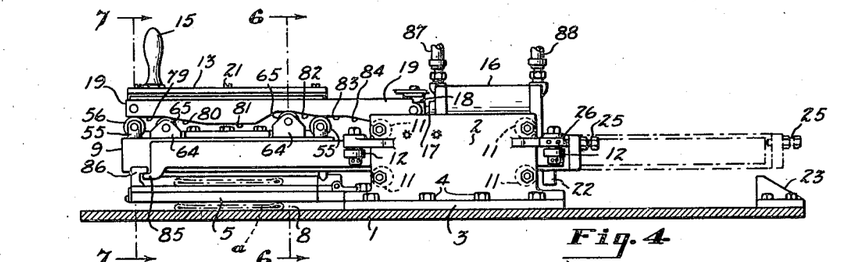
Fig. 4 is a section taken on the line indicated as 4—4 of Fig. 1, showing the splicer mechanism in side elevation and the slide which carries the operating mechanism in its forward position.

The machine of the present invention is mounted upon a suitable table or work bench 1, as shown in Figs. 1 and 2. The stationary frame of the machine comprises a pair of laterally spaced upright guide plates 2 having base flanges 3 secured to the table 1 by bolts 4 and an elongated bed plate 5 which projects forwardly beyond the guide plates 2, the projecting portion being spaced above the surface of the table by means of a spacer plate 6 located between the guide plates 2, the bed plates and spacer plates being secured to the table by bolts 7. The forward end of the bed plate 5 is unsupported, leaving a space 8 between the under side of the plate and the table 1 of sufficient height to receive a flattened inner tube during the splicing operation.

The plates 2 serve as guides for an elongated slide 9 which is provided with side bars 10 which are guided between upper and lower guide rollers 11 journalled on the plates 2, the slide being held against lateral movements by means of guide rollers 12 carried by the plates and engaging the side faces of the bars 10. At its forward end the slide 9 has a guide portion 13 above the body of the slide which has lateral flanges 14 at the top thereof and to the top of which a handle 15 is attached by means of which the operator may draw the slide forwardly to operating position.

A cylinder 16 is mounted on the slide 9 adjacent the rear end thereof and a piston rod 17 projecting through the head of the cylinder carries a cross head 18 to which is attached a pair of cam bars 19 which extend forwardly beneath the flanges 14. The top edges of the cam bars 19 are straight and slide on shims 20 mounted on the under sides of the flanges 14, the shims 20 being adjustably supported on the flanges 14 by means of screws 21.

Near its rear end the slide 9 is provided with a downwardly projecting stop lug 22 which engages with a stop 23 fixed to the table 1 to limit the rearward movement of the slide. At its rear end the slide 9 is provided with lateral flanges 24 which carry stop screws 25 which are engageable with abutments 26 carried by the guide plates 2 at their rear ends. The adjustment of the screws 25 determines the forward limit of movement of the slide. When the slide 9 is in its rearmost position the projecting portion of the bed plate 5 is unobstructed so that an operator may insert the central portion of a tube beneath the bed plate and position the ends of the tube in alignment with their ends in engagement on the top of the bed plate centrally thereof.

Figure 8:
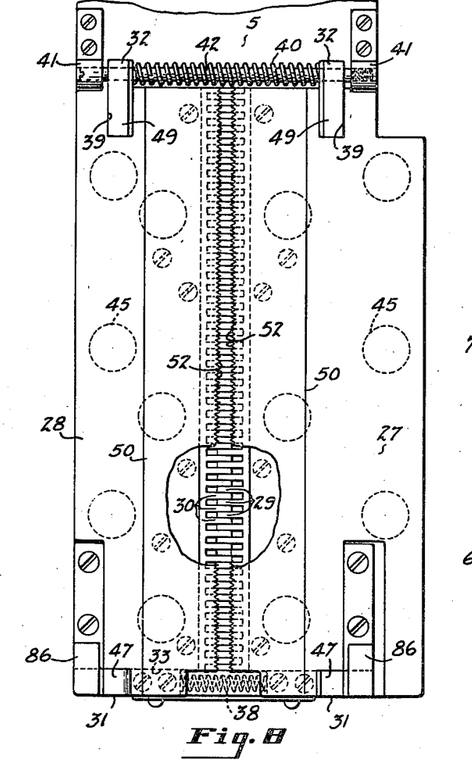
Fig. 8 is an enlarged plan view of the stationary bed plate and the gripping members mounted thereon.

The bed plate and the slide carry gripping members which engage the ends of the tube or other stock adjacent the abutting ends thereof and which are movable laterally while in gripping engagement with the stock to press the abutting ends together. As herein shown, the gripping members carried by the bed plate are two parallel transversely slidable plates 27 and 28 provided with inwardly projecting teeth 29 and 30 which are slidably interengaged, the teeth of one plate fitting between the teeth of the other. The interfingering teeth 29 and 30 permit relative lateral movements of the plates 27 and 28 and form a solid wall beneath the abutting ends of the stock being spliced to confine the stock at the splice while the abutting ends are being pressed together to cause the plastic rubber to form an integral union between the ends. Each of the plates 27 and 28 has a guide block 31 attached to its front end and a guide block 32 attached to its rear end. The guide blocks at both ends of the plates project below the under surface of the plates, the forward guide blocks 31 sliding in a rabbet 33 formed along the forward edge of bed plate 5 between stop blocks 34 and 35 secured to the bed plate 5. The stop blocks 34 and 35 have inwardly projecting flanges 36 and 37 which extend into grooves formed in the outer faces of the blocks 31 to hold the blocks 31 in sliding engagement with the plate 5. The guide blocks 31 are normally held in their outermost positions against the stop blocks 34 and 35 by means of a spring 38 interposed between the inner ends of the blocks. The rear guide blocks 32 are slidably mounted in recesses 39 formed in the bed plate 5, and are retained in the recesses by means of a cross rod 40 attached at its ends in fixed bearing members 41 and extending through apertures in the blocks 32, the apertures being formed to provide a sliding fit on the rod 40. The blocks 32 are normally held in their outermost positions against the outer walls of the recesses 39 by means of a coil spring 42 mounted on the rod 40 between the blocks and bearing at its ends against the inner faces of the blocks as best shown in Fig. 8.

To facilitate the sliding movements of the plates 27 and 28, anti-friction bearings are interposed between the bed plate 5 and the under sides of the plates 27 and 28. The bearings are spaced along each of the plates and each consists of a bearing disk 43 fitted in a recess in the plate 5, balls 44 which roll upon the upper surface of the disk 43, and bearing disks 45 set into the under faces of the plates 27 and 28 and resting upon the balls 44.

During the splicing operation the plates 27 and 28 are moved inwardly to apply pressure to the abutting ends of the stock. To enable the plates 27 and 28 to be moved inwardly by means of actuating members carried by the slide 9 the front blocks 31 are provided with upwardly projecting cam portions 46 provided on their outer sides with bevel faces 47. The rear guide blocks 32 are each provided with an upwardly projecting cam portion 48 provided with a bevel face 49 at its outer side. A downward pressure exerted on the bevelled faces 47 and 49 causes the plates 27 and 28 to be simultaneously moved inwardly against the pressure of the springs 38 and 42.

In order to provide an imperforate confining wall under the abutting ends of the stock, means is provided to cover the openings between the ends of the teeth 29 and 30 and the inner ends of the slots in which the teeth slide and to enable the plates 27 and 28 to effectively transmit a thrust to the rubber stock when they are moved inwardly, means is provided on each of the plates for engagement with the stock to resist slip. To accomplish these purposes plates 50 are set in recesses in the upper faces of the plates 27 and 28 and these plates have thin inner cover portions 51 which overlie the spaces between the ends of the teeth 29 and 30, and the inner ends of the slots in which the teeth slide. The inner edges of the cover portions 51 are spaced laterally a short distance apart and are provided with short upwardly projecting serrations or teeth 52 which engage with the stock to prevent the stock from slipping on the plates and for transmitting thrust to the stock when the plates are moved inwardly.

The plates 27 and 28 are actuated in an inward direction by means of four vertical plungers 53 slidably mounted in vertical bores formed in the slide 9. Each plunger 53 has a bevelled lower end 54 which engages with the bevel face of one of the guide blocks attached to one of the plates. The plungers 53 have yokes 55 at their upper ends which carry rollers 56 which bear against the under faces of the cam bars 19, being pressed upwardly against the cam bars by means of springs 57. The plungers 54 are so positioned in the slide 9 so that when the slide is in its forward operating position the plungers 53 at the front and rear are in alignment with the guide blocks 31 and 32.

Between the front and rear plungers 53 and adjacent thereto the slide 9 is provided with front and rear transversely elongated vertical guideways 58 and 59 in which are mounted slide blocks 60 which have vertical movement in the guideways and which also have guide rods 62 attached thereto and slidable in vertical bores in the body of the slide. The slide blocks 60 are normally held in a raised position by means of pullback springs 63 mounted on the guide rods 62 and interposed between the top of the slide 9 and enlargements at the upper ends of the rods 62.

Above the blocks 60, four vertical plungers 64 are mounted for vertical movement in the slide 9, one plunger being provided at each end of each of the elongated slide blocks 60. Each plunger 64 is provided with a roller 65 at its upper end which bears against the under side of one of the cam bars 19. Each plunger is provided at its lower end with a cushioning block 66 preferably formed of rubber, which bears against the top of one of the slide blocks 60.

The slide blocks 60 are provided on their under sides with undercut grooves 67 extending lengthwise thereof which receive guide lugs 68 and 69 which are rigidly attached to movable stock gripping plates 70 and 71 which correspond to the plates 27 and 28 on the bed 5. To facilitate the transverse movements of the plates 70 and 71 anti-friction ball bearings 72 are interposed between the tops of the lugs 68 and 69 and the slide blocks 60 and the plates 70 and 71 are normally held in their outermost positions by means of coil springs 73 interposed between the guide lugs of the two plates in the grooves 67.

Figure 9:
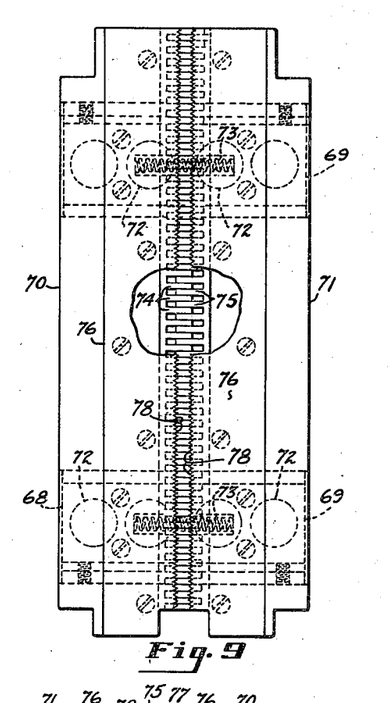
Fig. 9 is an enlarged bottom plan view of the vertically movable clamping member with the laterally movable gripping members carried thereby.
Figure 10:
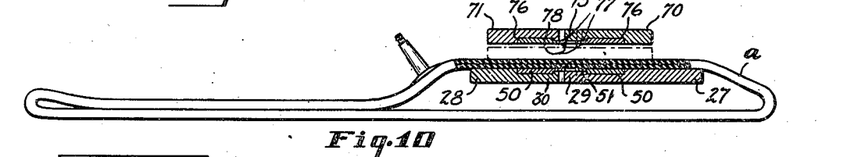
Fig. 10 is a sectional view showing the ends of an inner tube assembled between the clamping members.
Figure 11:
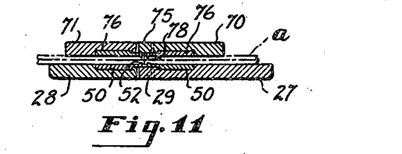
Fig. 11 is a sectional view showing the clamping members closed on the ends of the tube.

As best shown in Fig. 9 the plates 70 and 71 are provided at their inner edges with projecting teeth 74 and 75 which interfit and have sliding engagement during lateral movements of the plates. The interfingered teeth 74 and 75 of the plates 70 and 71 provide a wall directly over the splice which prevents upward flow of rubber due to pressure exerted on the stock at the splice. Plates 70 and 71 are also provided with means similar to that provided on the plates 27 and 28 on the bed to cover the openings between the ends of the teeth and the bases of the slots and to prevent slippage of the stock with respect to the plates. The slot covering and slip resisting means consists of plates 76 fitted to recesses in the under faces of the plates 70 and 71. These plates are provided with thin inner cover portions 77 which partially overlie the teeth 74 and 75 at the inner edges of the plates. The inner edges of the cover portions 77 are spaced a short distance apart and are provided with serrations or teeth 78 which project downward for engagement with the stock. When the slide 9 is moved forwardly to operative position the plates 70 and 71 are aligned with plates 27 and 28 on the bed so that when the plates 70 and 71 are moved downwardly the stock is gripped between the plates, one end of the stock being gripped between the plates 28 and 70 and the other end of the stock being gripped between the plates 29 and 71, the ends of the stock abutting in the central space between the spaced rows of slip resisting teeth.

Figure 5:
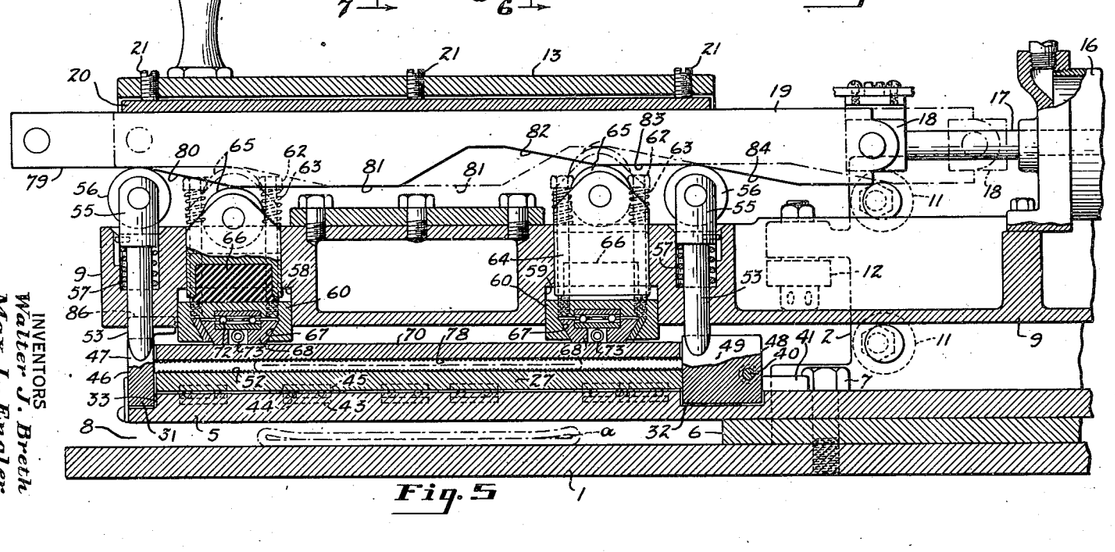
Fig. 5 is a longitudinal section through the splicer mechanism taken on the line indicated at 5—5 in Fig. 6.
Figure 6:
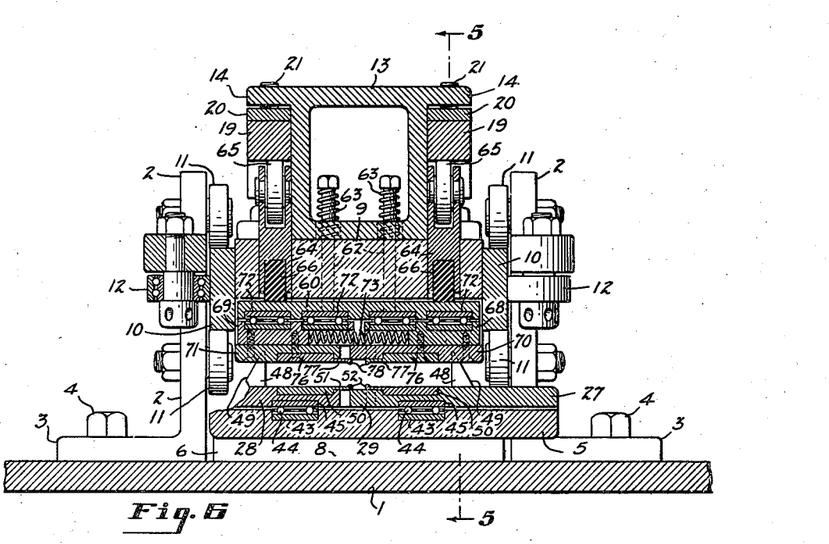
Fig. 6 is an enlarged section taken on the line indicated at 6—6 in Fig. 4.
Figure 7:
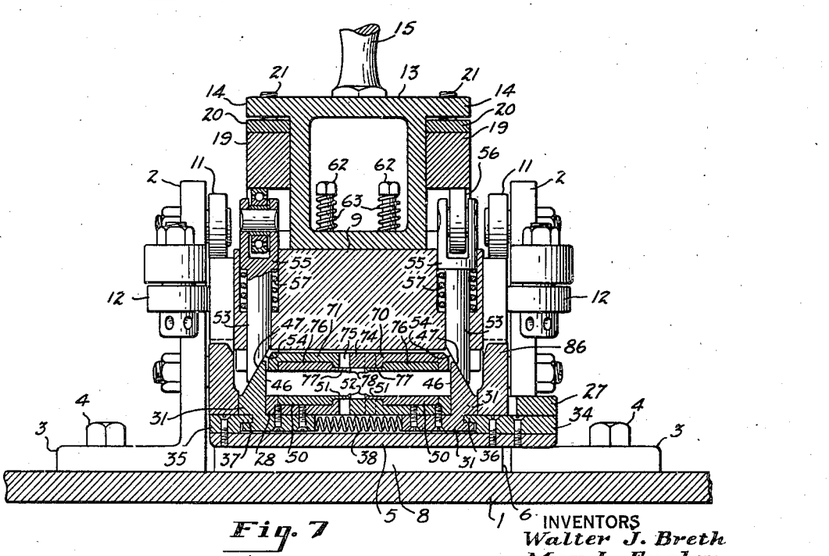
Fig. 7 is an enlarged section taken on the line indicated at 7—7 of Fig. 4.

In the operation of the machine, as, for example, in splicing the ends of an inner tube, the operator places a collapsed tube beneath the bed 5 as shown in Fig. 5 and brings the ends of the tube together at the center of the bed plate 5, the ends of the tube having been cut so that the ends will abut throughout the width of the flattened tube. The tube is placed in position for the splicing operation while the slide is in the position shown in Fig. 1 and may be secured in this position, during the advancement of the slide and until clamped by downward movement of the plates 70 and 71, by pressing the ends of the tube down upon the projecting teeth 52 carried by the plates 27 and 28 on the bed. The operator then grasps the handle 15 and pulls the slide 9 forwardly to its forward limit of movement at which time the plates 70 and 71 are directly over and in alignment with the plates 27 and 28 on the bed.

To perform the splicing operation the plates 70 and 71 are simultaneously moved downwardly into clamping engagement with the ends of the stock. Then, without releasing the clamping pressure, the plates 27 and 70 which grip the tube adjacent one end and the plates 28 and 71 which grip the tube adjacent the opposite end are simultaneously moved inwardly to apply pressure to the abutting ends of the tube. While the abutting ends of the tube are subjected to this pressure the spaces between the rows of tube engaging teeth 52 and 78 below and above the splice are closed by the interengaging teeth 29 and 30 of the plates 27 and 28 and the corresponding teeth 74 and 75 of the plates 70 and 71. Thickening of the tube at the splice due to the pressure exerted is thus avoided.

In order to perform the operations above described in the proper sequence the roller engaging bottom faces of the cam bars 19, which are moved longitudinally by means of the cylinder 16 and which actuate the plungers 53 and 64 are each provided, as best shown in Fig. 5, with a horizontal portion 79 at their forward ends, an inclined portion 80 at the rear end of the horizontal portion 79, and the second horizontal portion 81 at the rear of the inclined portion 80 which engage with the forward rollers 56 and 65 during movements of the bars. Similar cam surfaces are provided for engagement with the rear rollers 56 and 65, the bottom faces of the bars 19 being provided with an inclined portion 82, a horizontal portion 83 and a second inclined portion 84 at the rear end of the horizontal portion 83. When the bars 19 are in their rearmost positions the forward rollers 56 engage with the forward end portions of the horizontal cam surfaces 79 and the forward rollers 65 engage with the rearmost portions of the horizontal surfaces 79. The rear rollers 65 engage the bar just in advance of the inclined cam portions 82 and the rear rollers 56 engage the bar at the forward end of the horizontal portion 83. When the bars 19 are moved in a forward direction, the front and rear plungers 64 are first forced downwardly by the inclined cam portions 80 and 82, while the front and rear cam rollers 56 remain in their uppermost position in engagement with the horizontal portions 79 and 83 of the cam.

The lower limits of movement of the plungers 64 may be varied to correspond with the thickness of the stock being handled by adjusting the shims 20. The cushion blocks 66 interposed between the plungers 64 and the guide members 60 supporting the upper clamping plates permits some yielding between the actuating plungers and the clamping members, and avoids the application of excessive pressure upon the stock. The length of the cam portions 79, 80, 82 and 83 are such that when the front and rear rollers 65 have been moved downwardly to their lowermost positions and engage with the horizontal portions 81 and 83 of the cams, the front and rear rollers 56 are at the rear ends of the horizontal portions 79 and 83 of the cams, so that further forward movement of the cam bars simultaneously depresses the plungers 53, which act upon the slide blocks 31 and 32 at the front and rear ends of the plates 27 and 28 and cause the plates to be simultaneously moved inwardly. The movement of the clamping plates 70 and 71 to clamping position brings these plates between the upwardly projecting portions of the guide blocks 31 and 32 so that the outer edges of the plates 70 and 71 are engaged by the projecting portions of the blocks and moved inwardly simultaneously with the plates 27 and 28. When the cam bars 19 are in their forward position all of the plungers 53 and 64 are in their lowermost position, and the abutting ends of the tube are held together under pressure. After a short time interval during which the abutting ends of the tube are confined and subjected to pressure, the plastic rubber integrally unites, forming a splice without any substantial thickening of the rubber where the abutting ends are joined.

Figures 14, 19:
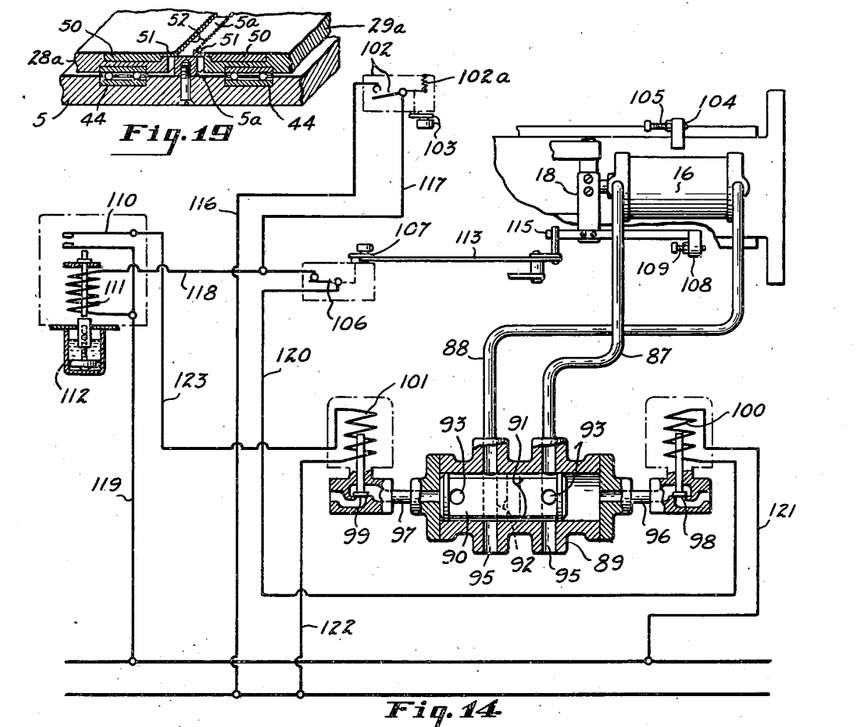
Fig. 14 is a diagrammatic view showing the valves controlling the operation of the fluid pressure actuating mechanism and the wiring of the electrical devices which control said valves.
Fig. 19 is a sectional view showing stock-gripping members of slightly modified construction.
Figure 15:
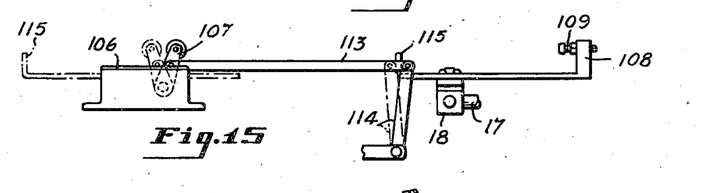
Fig. 15 is a detail view showing a device for resetting one of the controlling switches.
Figure 16:
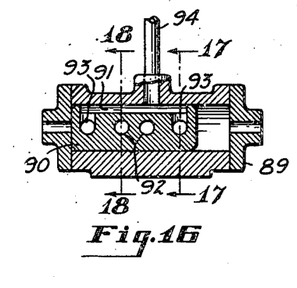
Fig. 16 is a longitudinal section through the control valve for the actuating cylinder.
Figure 17:
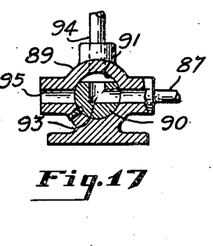
Fig. 17 is a section taken on the line indicated at 17—17 in Fig. 16.

It is essential that the stock be confined at the splice to prevent an unsightly enlargement in cross section at the splice. The interfingering teeth on the laterally slidable clamping plates serve the purpose effectively, but other constructions may be provided. As shown in Fig. 19, clamping plates 27a and 28a have no teeth at their inner edges. In this modification the stock engaging plates 5 are fixed to the plates 27a and 28a and have their thin inner edge portions 51 projecting beyond the inner edges of the plates and sliding upon a black 5a fixed to the bed 5. The block 5a provides a solid wall bridging the space between the toothed edges 52 of the plates 50 and confining the stock at the splice.

In order to prevent the projecting end of the cam plate 5 springing away from the upper clamping members during the clamping operation, the slide 9 is provided with lugs 85 at its forward end which engage with keepers 86 fixed to the bed plate 5 when the slide is in its operating position, the lugs 85 taking the thrust transmitted through the bed plate 5 to prevent the forward end of the bed plate springing away from the slide 9 during the operation.

Figure 12:
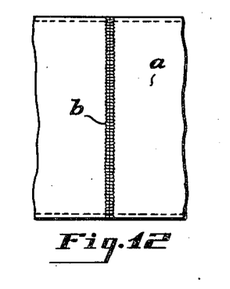
Fig. 12 is a fragmentary plan view showing the splice formed between the ends of the tube.
Figure 13:
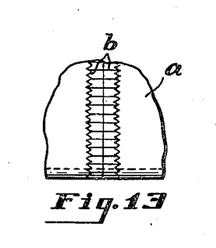
Fig. 13 is a fragmentary plan view on an enlarged scale showing a portion of the splice.

Figs. 12 and 13 show a splice made by the machine between the ends of a tube a, the wall of the tube at the splice being of the same thickness as in other portions of the tube, the outer surface of the tube having a row of minute indentations b along opposite sides of the splice which are made by the rows of teeth 52 and 78 of the clamping plates.

In order to effect a permanent union at the splice, pressure is maintained on the abutting ends for a short period of time, after which the clamping devices are released and the slide 9 is returned to its original position, so that the spliced tube can be removed and another tube may be placed in position for slicing. The slide 9 may be moved both forwardly or rearwardly by hand; or if desired the slide may be set at a slight incline so that it will return to inoperative position by gravity upon release of the clamping device. In order to increase speed of operation, means is preferably provided for automatically actuating the cam bars when the slide is brought to its operating position and, in order to insure the maintenance of pressure for the time necessary to effect a perfect union of the rubber at the splice, means is preferably provided to cause the cam bars to dwell for a predetermined time interval in their forward position and then to return the cam bars to their original position to release the stock.

Figure 18:
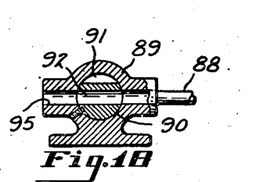
Fig. 18 is a section taken on the line indicated at 18—18 in Fig. 16.

An automatic control for the cam actuating cylinder 16 is shown in Figs. 14 and 18 of the drawings. The front and rear ends of the cylinder 16 are connected by means of flexible pipes 87 and 88 to a control valve 89 which is provided with a sliding plunger 90 having a recess 91 on one side. The plunger 90 is provided with diametrical passages 92 intermediate its ends and with L-shape passages 93 adjacent its ends. The movement of the plunger 90 in the valve casing corresponds to the spacing between the passages 92 which are so positioned that when the plunger 90 is at the forward end of the valve casing, as shown in Fig. 14, one of the passages 92 registers with the casing opening to which the pipe 88 is connected, and one of the passages 93 registers with the opening to which the pipe 87 is connected. A pressure supply pipe 94 communicates with the recess 91 of the plunger in all positions of the plunger so that pressure is supplied to the cylinder through the L-shaped passage 93 and the pipe 87, while the other pipe 88 which registers with one of the passages 92 communicates with an exhaust opening 95 in the valve casing. When the plunger 90 is shifted from one end of the valve casing to the other, the fluid connections to the cylinder 16 are reversed. By actuating the plunger 90, pressure may be admitted to the cylinder 16 to move the cam bars 19 forwardly, and by then shifting the plunger 90 to the opposite end of the casing the pressure will be supplied to the opposite end of the cylinder 16 to return the cam bars 19 to their original position. Movements of the plunger 90 are controlled by means of air escape passages 96 and 97 at opposite ends of the valve casing, passages 96 and 97 being provided with valves 98 and 99 which may be opened to release the pressure at the end of the plunger toward which it is desired to move the plunger.

As herein shown the valve 98 is controlled by solenoid 100 and the valve 99 is controlled by solenoid 101. Means is provided for automatically controlling the solenoids 100 and 101 to actuate the valves including a normally open control switch 102 mounted at one side of the machine and having a lever 103 which is operated by a trip device carried by the slide 9. The trip device consists of a lug 104 fixed to the slide and carrying an adjustable trip screw 105 which can be adjusted forwardly or rearwardly to change the point in the forward movement of the slide at which the switch 102 is closed. On the opposite side of the machine there is mounted a normally closed switch 106 provided with an actuating lever 107 which is engaged by a trip device carried by the crosshead 18. This trip device consists of a lug 108 fixed to the crosshead and carrying the adjustable trip screw 109 which can be adjusted forwardly or rearwardly to vary the interval between the actuation of the switch 102 and the switch 106. The normally open switch 102 is actuated as the slide approaches its forward operating position and the normally closed switch 106 is opened during the final forward movement of the cam bars. In addition to the switches 100 and 106, a timing switch 110 is provided. The switch 110 is normally open and is controlled by a solenoid 111 which, when energized, moves the switch 110 to closed position. The switch closing movement of the solenoid 111 is retarded by a suitable timing device, such as an adjustable dash pot retarder 112 of conventional design, to provide the desired predetermined time interval between the energization of the solenoid 111 and the closing of the switch 110.

In Fig. 14 of the drawings the valves and switches are shown in the positions which they occupy when the slide is in its rearmost position. The forward end of the cylinder 16 is connected through the pipe 87 and rearmost passage 93 of the plunger 90 to the pressure line 94 and the rear end of the cylinder is connected through the pipe 88 and forward passage 92 of the plunger 90 to the forward exhaust opening 95 of the valve casing. Pressure is thus maintained in the forward end of the cylinder 16 to hold the piston and the attached cam bars 19 in their rearmost position. When the operator pulls the slide 9 forwardly to its operative position the normally open switch 102 is closed by engagement of the trip screw 105 with the lever 103 and is held closed while the slide remains in its forward position. Closing of the switch 102 completes a circuit through the normally closed switch 106 and solenoid 100, opening the valve 98 and also completes a circuit through the solenoid 111 of the timing switch. Actuation of the solenoid 100 opens the valve 98, releasing the pressure at the rear end of the valve 89, causing the plunger 90 to move to the rear end of the valve chamber, reversing the fluid pressure connections to the cylinder 16, advancing the piston in the cylinder, and causing the cam bars 19 to move forwardly. As the cam bars 19 approach the end of their forward movement the switch lever 107 is actuated to open the switch 106, breaking the circuit through the solenoid 100 and permitting the valve 98 to close. Opening the switch 106, however, does not break the circuit through the solenoid 111, which is independent of the switch 106. This solenoid, after a predetermined time interval, closes the switch 110, which closes the circuit through the solenoid 101, causing the valve 99 to open to again shift the plunger of the control valve and reverse the fluid pressure connections to the cylinder 16, causing the cam bars 19 to be retracted. Upon release of the clamping members due to the return movement of the cam bars 19 the slide 9 is free to move rearwardly, to clear the clamping portion of the bed plate to permit removal of the spliced tube and the insertion of another tube to be spliced.

The normally open switch 102 is held open when disengaged from the trip member carried by the slide by means of a suitable spring 102ᵃ. The switch 106, however, remains open until reset by devices actuated by the slide 9 as the slide approaches its rearmost position. The operating lever 107 of the switch 106 is connected to a rearwardly extending link 113, the rear end of which is pivoted to the upper end of an arm 114 pivoted to the frame of the machine, and the lug 108 has a forwardly projecting hook 115 attached thereto which engages with the arm 114 during the rearward movement of the slide to swing the arm 114 and lever 107 rearwardly to close the switch 106. Actuation of the switch 106 by the slide to close the same prevents accidental actuation of the clamp operating mechanism when the slide is in an intermediate position.

The switch 102 is connected to line through a lead 116 and to the normally closed switch 106 through a lead 117. The solenoid 111 is connected to the lead 117 intermediate the switches 102 and 106 by a lead 118 and to line through a lead 119. A lead 120 connects the switch 106 to the solenoid 100 and the solenoid is connected to line through a lead 121. The solenoid 101 is connected to line through a lead 122 and through a lead 123 to the switch 110, which is connected to line through the lead 119.

The machine of the present invention forms a splice between ends of uncured rubber stock without thickening the stock at the splice. This feature is particularly desirable in splicing the ends of inner tubes, since it avoids the thickening of the tube walls at the splice. By reason of the automatic sequence of operations controlled by movements of the slide, the operation of the machine is very rapid. The movement of the slide clears the bed plate after each operation, enables the operator to remove the spliced tube and to place another tube in position for splicing very quickly.

Furthermore, the confining ends of a tube under pressure makes it unnecessary to skive the ends prior to splicing, as has heretofore been common practice.

Although a single embodiment of the invention has been herein shown and described it will be understood that numerous modifications of the construction shown may be resorted to without departing from the spirit of this invention as defined in the appended claims.

What we claim is:

1. A machine for splicing uncured rubber stock comprising a pair of clamping members, laterally spaced stock engaging elements slidably mounted on opposed faces of said clamping members and adapted to engage the stock to be spliced near the ends thereof, means for actuating the clamping members to grip the stock between opposed stock-engaging elements, and means for moving a pair of stock engaging elements laterally between said clamping members to press the ends of the stock together.

2. In a machine for splicing uncured rubber stock, a pair of relatively movable clamping members each having a pair of spaced stock engaging members mounted for lateral movement, one toward the other, and engageable with the two stock ends to be spliced inwardly of the end faces thereof, the stock engaging members of each pair having interfitting slidably engaging fingers which form a confining wall closely overlying the abutting ends of the stock, means for holding the clamping members in stock clamping position, and means for actuating the stock engaging members to apply pressure to the abutting stock ends.

3. A machine for splicing uncured rubber stock comprising a pair of clamping members having, on the opposed faces thereof, laterally spaced stock engaging elements adapted to engage the stock to be spliced near the ends thereof, means for actuating the clamping members to grip the ends of the stock, means for moving a pair of stock engaging elements laterally between the said clamping members to apply pressure to the abutting ends of the stock, and a timing mechanism controlling said actuating means to release the stock after a predetermined time interval.

4. A machine for splicing uncured rubber stock comprising a bed, a pair of laterally movable stock engaging members on said bed, a vertically movable clamping member above the bed, a pair of laterally movable stock engaging members on the under face of the clamping member which are alined with the stock engaging members on the bed, means for moving the said clamping member toward the bed to grip the stock near the ends thereof between the stock engaging members, and means for simultaneously moving said stock engaging members on the bed and clamping member to press the ends of the stock together.

5. A machine for splicing uncured rubber stock comprising a bed, a pair of laterally movable stock engaging members on said bed, a vertically movable clamping member above the bed, a pair of laterally movable stock engaging members on the under face of the clamping member which are alined with the stock engaging members on the bed, means for moving the said clamping member toward the bed to grip the stock near the ends thereof between the stock engaging members, means for simultaneously moving said stock engaging members on the bed and clamping member to press the ends of the stock together, and means for maintaining pressure on said clamping and stock engaging members for a predetermined time and for then releasing the stock.

6. A machine for splicing uncured rubber stock comprising a bed, a pair of laterally movable stock engaging members on said bed, a vertically movable clamping member above the bed, a pair of laterally movable stock engaging members on the under face of the clamping member which are alined with the stock engaging members on the bed, means for moving the said clamping member toward the bed to grip the stock near the ends thereof between the stock engaging members, and for maintaining a pressure upon the clamping member, and means operable after the clamping member has been moved to clamping position, for applying lateral pressure to each of said movable stock engaging members to move the same toward the abutting ends of the stock to press the ends of the stock together.

7. A machine for splicing uncured rubber stock comprising a bed, parallel laterally movable stock engaging members on the bed, a slide, a vertically movable clamping member carried by the slide and movable with the slide from a position at one side of the bed to an operative position directly over the bed, laterally movable stock engaging members carried by the clamping member and alined with the stock engaging members on the bed, and means operable automatically upon movement of the clamping member to operative position to first move the clamping member to stock gripping position and then to move the stock engaging members inwardly over the bed to press the ends of the stock together.

8. A machine for splicing uncured rubber stock comprising a bed, parallel laterally movable stock engaging members on the bed, a slide, a vertically movable clamping member carried by the slide and movable with the slide from a position at one side of the bed to an operative position directly over the bed, laterally movable stock engaging members carried by the clamping member and alined with the stock engaging members on the bed, means operable automatically upon movement of the clamping member to operative position to first move the clamping member to stock gripping position and then to move the stock engaging members inwardly over the bed to press the ends of the stock together, and a timing mechanism controlling said operating means for releasing the stock after a predetermined time interval.

9. A machine for splicing uncured rubber stock comprising means for gripping each of two stock ends to be joined inwardly of the ends thereof and holding the same in alinement with the end faces in engagement, means for actuating the gripping means to press the abutting ends of the stock together, means for confining the rubber stock at the abutting ends thereof against lateral flow, a timing mechanism controlling the gripping means to release the same after a predetermined time interval, and means for adjusting said timing mechanism to vary said time interval.

10. A machine for splicing uncured rubber stock comprising a bed, parallel plates mounted for lateral sliding movement on the bed, said plates having slidably interfitting fingers along their inner edges, a slide, a vertically movable clamping member carried by the slide and movable with the slide into operative position with respect to the bed, said clamping member having a pair of plates mounted on its under side in alinement with the plates of the bed, said plates having slidably interfitting fingers along their inner edges, means operable when the clamping member is in operative position to move the clamping member toward the bed to clamp the ends of the stock between alined plates, projections on the stock engaging faces of said plates engageable with the rubber stock to resist slip, and means operable when said the clamping member is in clamping position to simultaneously move said plates inwardly to press the abutting ends of the stock together.

11. A machine for splicing uncured rubber stock comprising a bed, parallel plates mounted for lateral sliding movement on the bed, said plates having slidably interfitting fingers along their inner edges, a slide, a vertically movable clamping member carried by the slide and movable with the slide into operative position with respect to the bed, said clamping member having a pair of plates mounted on its under side in alinement with the plates of the bed, said plates having slidably interfitting fingers along their inner edges, means operable when the clamping member is in operative position to move the clamping member toward the bed to clamp the ends of the stock between alined plates, projections on the stock engaging faces of said plates engageable with the rubber stock to resist slip, means operable when said clamping member is in clamping position to simultaneously move said plates inwardly to press the abutting ends of the stock together, and a timing mechanism controlling the clamping and plate moving means to release the stock after a predetermined time interval.

12. A machine for splicing uncured rubber stock comprising laterally spaced pairs of gripping members adapted to grip the ends of the rubber stock to be spliced, said pairs of gripping members being mounted for relative lateral movement, mechanism for operating said gripping members comprising means for first actuating said members to simultaneously grip the ends of the stock to be spliced then imparting relative lateral movement to the pairs of gripping members to press the ends of the stock together and hold the same under pressure, and means for confining the rubber stock at the abutting ends thereof against lateral flow during application of pressure.

13. A machine for splicing uncured rubber stock comprising laterally spaced pairs of gripping members adapted to grip the ends of the rubber stock to be spliced, said pairs of gripping members being mounted for relative lateral movement, mechanism for operating said gripping members comprising means for first actuating said members to simultaneously grip the ends of the stock to be spliced then imparting relative lateral movement to the pairs of gripping members to press the ends of the stock together and hold the same under pressure, means for confining the rubber stock at the abutting ends thereof against lateral flow during application of pressure, and a timing mechanism controlling said actuating mechanism to release the stock after pressure has been applied thereto for a predetermined time.

14. A machine for splicing uncured rubber stock comprising a support, laterally alined stock gripping devices mounted for relative lateral movement on the support and adapted to grip the stock near the ends to be joined, means for actuating said gripping devices to grip the stock, means for applying a pressure to the gripping devices to move one laterally toward the other to press the end faces of the rubber stock together, and stock confining members positioned to closely overlie the contiguous ends of the rubber stock for confining the rubber at the splice against lateral flow during application of pressure thereto.

15. A machine for splicing uncured rubber stock comprising a support, laterally alined stock gripping devices mounted for relative lateral movement on the support and adapted to grip the stock near the ends to be joined, means for actuating said gripping devices to grip the stock, means for applying a pressure to the gripping devices to move one laterally toward the other to press the end faces of the rubber stock together, and members movable with the gripping devices and adapted to closely overlie the contiguous ends of the stock on opposite sides thereof for confining the rubber of the splice against lateral flow during the application of pressure thereto.

16. A machine for splicing uncured rubber stock comprising a support, laterally alined stock gripping devices mounted for relative lateral movement on the support and adapted to grip the stock near the ends to be joined, means for actuating said gripping devices to grip the stock, means for applying a pressure to the gripping devices to move one laterally toward the other to press the end faces of the rubber stock together, stock confining members positioned to closely overlie the contiguous ends of the rubber stock for confining the rubber at the splice against lateral flow during application of pressure thereto, and a timing mechanism for controlling said pressure applying means to release the pressure on the stock after the stock has been subjected to pressure for a predetermined time interval.

17. A machine for splicing uncured rubber stock comprising a support, two pairs of laterally alined gripping members carried by the support, the pairs of gripping members being relatively movable toward and away from each other to grip the ends of the stock to be spliced, the gripping members of each pair being mounted for relative lateral movements and having lateral projections which slidably interfit to provide confining walls at opposite sides of the stock ends held by the gripping members, means for actuating said gripping members to grip the stock ends, and means for exerting lateral pressure on the stock gripping elements to apply pressure to the stock ends engaging in the space between the confining walls.

WALTER J. BRETH.
MAX L. ENGLER.